United States Patent
Miettinen et al.

(10) Patent No.: US 8,331,904 B2
(45) Date of Patent: Dec. 11, 2012

(54) APPARATUS AND A SECURITY NODE FOR USE IN DETERMINING SECURITY ATTACKS

(75) Inventors: Markus Miettinen, Helsinki (FI); Kimmo Hatonen, Helsinki (FI)

(73) Assignee: Nokia Corporation, Espoo (FI)

( * ) Notice: Subject to any disclaimer, the term of this patent is extended or adjusted under 35 U.S.C. 154(b) by 876 days.

(21) Appl. No.: 11/584,052

(22) Filed: Oct. 20, 2006

(65) Prior Publication Data

US 2008/0096526 A1    Apr. 24, 2008

(51) Int. Cl.
*H04M 1/66* (2006.01)
(52) U.S. Cl. .............................. 455/410; 726/23; 709/224
(58) Field of Classification Search .................. 455/410, 455/411; 726/13, 22–25; 709/224, 22, 23, 709/24, 14
See application file for complete search history.

(56) References Cited

U.S. PATENT DOCUMENTS

| | | | |
|---|---|---|---|
| 6,408,391 B1 | 6/2002 | Huff et al. | 713/201 |
| 6,530,024 B1* | 3/2003 | Proctor | 726/23 |
| 7,200,866 B2* | 4/2007 | Kim et al. | 726/23 |
| 2003/0027550 A1* | 2/2003 | Rockwell | 455/410 |
| 2003/0188190 A1 | 10/2003 | Aaron et al. | 713/201 |
| 2004/0044912 A1* | 3/2004 | Connary et al. | 713/201 |
| 2004/0205419 A1* | 10/2004 | Liang et al. | 714/57 |
| 2004/0260945 A1 | 12/2004 | Raikar et al. | 713/201 |
| 2006/0191008 A1* | 8/2006 | Fernando et al. | 726/23 |

FOREIGN PATENT DOCUMENTS

EP    1701500 A1    9/2006

OTHER PUBLICATIONS

K. Akkaya, M. Younis, A survey on routing protocols for wireless sensor networks, Ad Hoc Networks, vol. 3 (Issue 3), May 2005, 325-349.*
R. Lippmann, J.W. Haines, D.J. Fried, J. Korba, K. Das, The 1999 DARPA off-line intrusion detection evaluation, Computer Networks vol. 34 (Issue 4), Oct. 2000, 579-595.*
Snapp et al., "A System for Distributed Intrusion Detection", COMPCON Spring '91, Feb. 1991, pp. 170-176.
Benattou, M, et al., "Intelligent Agents for Distributed Intrusion Detection System", ©2005 World Enformatika Society, Enformatika V6 2005, ISSN 1305-5313, p. 190-193.
Inverardi, P, et al., "Synthesis of correct and distributed Adaptors for Component-Based Systems: An Automatic Approach", Nov. 7-11, 2005, Long Beach, California, ASE '05, © 2005 ACM 1-58113-993-4/05/0011, 5 pgs.

* cited by examiner

*Primary Examiner* — Kamran Afshar
*Assistant Examiner* — Yousef Rod
(74) *Attorney, Agent, or Firm* — Harrington & Smith

(57) ABSTRACT

Apparatus including functionality configured to monitor said apparatus for security attacks; and a reporter configured to send data to a security node, wherein the data sent to said security node is dependent on a security level of said apparatus.

26 Claims, 3 Drawing Sheets

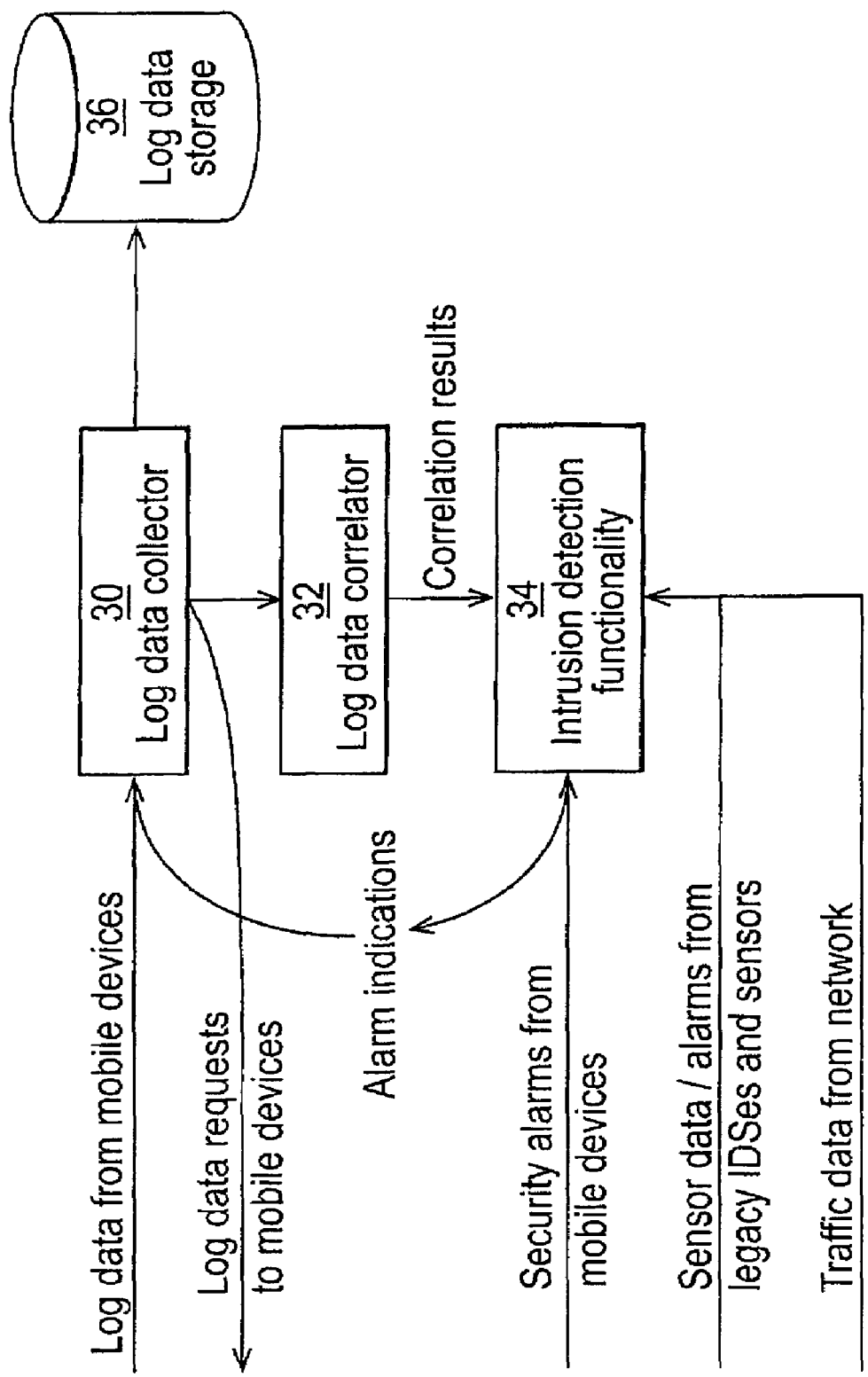

APPARATUS AND A SECURITY NODE FOR USE IN DETERMINING SECURITY ATTACKS

FIELD OF THE INVENTION

The present invention relates to a apparatus and a security node, for use in determining security attacks.

BACKGROUND OF THE INVENTION

A communication system is a facility which enables communication between two or more entities such as user terminal equipment and/or network entities and other nodes associated with a communication system. The communication may comprise, for example, communication of voice, electronic mail (email), text messages, data, multimedia and so on. The communication may be provided by a fixed line and/or wireless communication interface.

A feature of wireless communication systems is that they provide mobility for the users thereof. An example of communications systems providing wireless communication are public land mobile networks (PLMN). Another example is a wireless local area network (WLAN). An example of the fixed line system is a public switched telephone network (PSTN).

User equipment, whether connected to a wired network via a wired connection or a wireless device making a connection to an access point via a radio connection are becoming increasingly the target for computer security related attacks. For example, viruses and worms can target user equipment. Other potential threats are so-called "backdoor programs", Trojan horses and intrusion attacks. To address this, user equipment is often provided with protection mechanisms such as access control and authorization systems. However, it is not always possible to make the user equipment secure. This may be because the consumer is not prepared to pay the costs associated in making user equipment totally secure or because the nature of the threat changes. In practice, it is therefore difficult to make user equipment that is impervious to malicious software or actual attackers.

Reference is made to the paper entitled "Intelligent Agents for Distributed Intrusion Detection System", M. Benattou and K. Tamine, Transactions on Engineering, Computing and Technology, V6, June 2005, pages 190-93. This paper describes a distributed intrusion detection system based on the specialised local agent and the agent's community concept. A specialized local agent is used to separate monitoring tasks. The agent's community is a group of specialized agents, created for collecting and analysing analyzing all the data from predetermined network nodes. The specialized local agent is able to execute predetermined actions and use the mobile agent environment to investigate other network nodes of the same community. The agent's community collaborates and cooperates to confirm an intrusion in the predetermined network.

In this query, agents are sent to network nodes whenever something suspicious is detected in at least in one network node. A control structure is provided for coordinating the system consisting of these query agents and analyzing and correlating agents. This is a reactive approach based on predefined rules.

Reference is also made to "Synthesis of Correct and Distributed Adaptors for Component-Systems: An Automatic Approach", P. Inverardi, et al, which discusses using distributed intrusion detection system filters. It is a specification-based approach to detect intrusions at the architectural level. It is decentralised in that given a global policy for the whole system, it automatically generates a monitoring filter for each component that looks at local information of interest. Filters then suitably communicate in order to carry on cooperative detection of anomalous behavior in enforcement of the global policy.

This document proposes a system to interpret a set of global rules as multiple sets of local rules that with local actions maintain the global integrity. To achieve this, all the actions, i.e., communication patterns and nodes taking part in them need to be specified. Based on these specifications the global automaton can be translated to set of local automata which combination is equal to global automaton. These definitions are very difficult to define and maintain. Their integrity and correctness are difficult to verify.

SUMMARY OF THE INVENTION

It is an aim of some embodiments of the invention to address the above described problems.

According to one aspect of the present invention, there is provided an apparatus comprising: a data collector configured to receive data from a plurality of devices; and functionality configured to determine from said received data security attacks.

According to a second aspect of the invention, there is provided a method comprising: receiving data from a plurality of devices; and determining from said received data security attacks.

According to another aspect there is provided apparatus comprising: functionality configured to monitor said apparatus for security attacks; and a reporter configured to send data to a security node, wherein the data sent to said security node is dependent on a security level of said apparatus.

According to another aspect there is provided apparatus comprising: a data collector configured to receive data from a plurality of devices; a correlator configured to correlate said received data to filter said received data; and functionality configured to determine from said received data security attacks.

According to another aspect there is provided a method comprising: collecting security related data; sending at least some of said security related data to a security node, the amount of data sent being dependent on a security level.

According to another aspect there is provided a method comprising: receiving data from a plurality of devices; correlating said received data to filter said received data; and determining from said received data security attacks.

According to another aspect there is provided a system comprising: a device comprising functionality configured to monitor said device for security attacks and a reporter configured to send data to a security node; and a security node configured to receive data from said devices, said security node comprising a functionality configured to determine from said received data security attacks.

According to another aspect there is provided a computer readable medium comprising: program code for collecting security related data; and program code for sending at least some of said security related data to a security node, the amount of data sent being dependent on a security level.

According to another aspect there is provided a computer readable medium comprising: program code for receiving data from a plurality of devices; program code for correlating said received data to filter said received data; and program code for determining from said received data security attacks.

According to another aspect there is provided apparatus comprising: data collecting means for receiving data from a plurality of devices; correlation means for correlating said received data to filter said received data; and means for determining from said received data security attacks.

According to another aspect there is provided apparatus comprising: means for monitoring said apparatus for security attacks; and reporting means for sending data to a security node, wherein the data sent to said security node is dependent on a security level of said apparatus.

BRIEF DESCRIPTION OF THE FIGURES

For a better understanding of the present invention and as to how the same may be carried into effect, reference will be made by way of example only to the accompanying drawings in which:

FIG. 3 schematically shows a security node embodying the present invention.

DETAILED DESCRIPTION OF PREFERRED EMBODIMENTS OF THE PRESENT INVENTION

Figure 1:
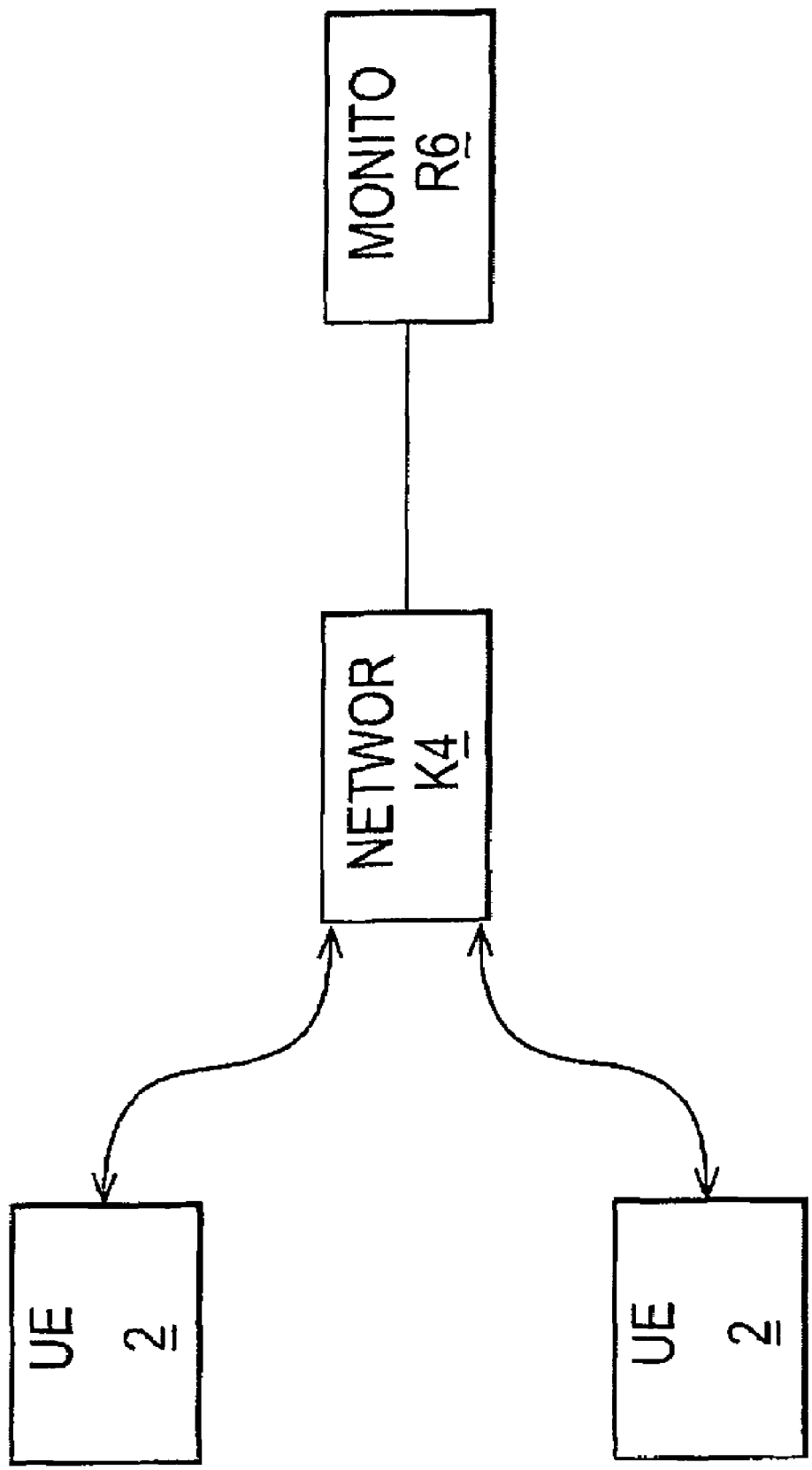
FIG. 1 schematically shows a network environment in which embodiments of the present invention can be implemented.

Reference is first made to FIG. 1 which schematically shows a network environment in which embodiments of the present invention can be implemented.

The network comprises user equipment 2. In preferred embodiments of the present invention, the user equipment is wireless, that is the user equipment communicates with an access point wirelessly, for example using radio frequencies. The user equipment can take any suitable format and may for example be a portable computer, mobile telephone, personal data assistant, organiser or the like.

In alternative embodiments of the present invention, the user equipment may be wired, that is connected via a physical line or wire to an access point. In that scenario, the user equipment can take any suitable format and may be a computer, telephone, personal data assistant, organizer or the like.

Whilst in a preferred embodiment of the present invention the user equipment comprises a communications device, it should be appreciated that in an alternative embodiment of the present invention, the user equipment may for example be a node which for example collects data or the like and is required to communicate that data to one or more nodes.

The user equipment 2 is connected to a network 4. The network may be a local network, such as a wireless local area network and, for example, be the internal network of a company. Alternatively, the network 4 can be, for example, a mobile network to which the user has subscribed.

A security device 6 is connected to the network. In some embodiments of the invention, the security device 6 may be considered to be part of the network. It should be appreciated that in some embodiments of the present invention, the security device may be a stand alone node whilst in other embodiments of the present invention, its functionality can be incorporated into another element of the network.

In the arrangement shown in FIG. 1, a single security device 6 is shown. In alternative embodiments of the present invention, more than one security device 6 may be provided. In the scenario where more than one security device 6 is provided, the differing devices may be arranged to communicate with each other directly or via a network.

Embodiments of the present invention are arranged to provide a method for performing intrusion detection in a population of mobile devices. In the context of this document, the word "intrusion" is used to cover any type of security related attacks, unauthorized access, any type of security incident or violations of security policy. This may be regardless of whether or not the "intrusion" is intentional or not. As mentioned previously, embodiments of the present invention are particularly applicable to mobile devices in a mobile network, but can also be applied to devices in an internal network of an organization.

In embodiments of the present invention, local intrusion detection functionalities are provided on the user equipment and on the other hand network level intrusion detection and alarm correlation are provided by the security device in order to improve the sensitivity and efficiency of the intrusion detection.

Figure 2:
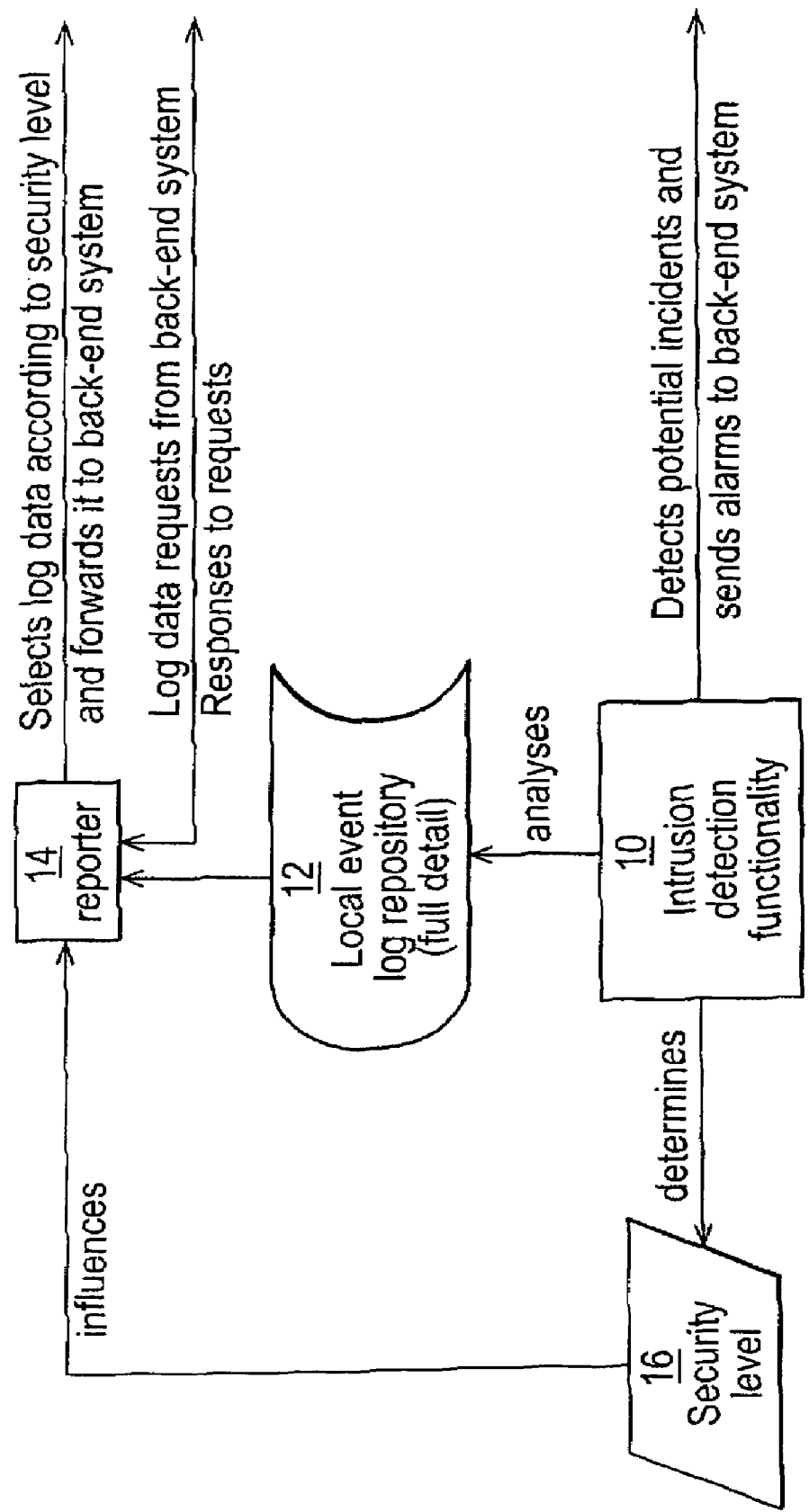
FIG. 2 schematically shows user equipment embodying the present invention.

Reference is now made to FIG. 2, which schematically shows elements of user equipment embodying the present invention. In embodiments of the present invention, not all details of security events monitored and logged by the user equipment are transmitted to the security device which provides the network level security monitoring. This is, for example, so as to avoid having a detrimental effect on bandwidth and efficiency constraints. Collecting all the data obtained by the user equipment and sending it to the security device would not be efficient since the volume of data would consume too much bandwidth in many environments, particularly where the number of mobile devices to be monitored is large. However, in other environments, there may not be such bandwidth and efficiency constraints and, accordingly, a different strategy may be adopted in such environments.

The user equipment comprises intrusion detection functionality 10 that can be rule-based to provide misuse detection and/or behavior profile-based to provide anomaly detection. The intrusion detection functionality 10 is arranged to ensure that key features of the user equipment's behavior and security status is monitored. The intrusion detection functionality 10 is arranged to maintain a measure of the security level. In particular, the intrusion detection functionality determines the security level of security level functionality 16. The intrusion detection functionality 10 is thus based on the profile of the device and/or detection rules which monitor the user equipment locally.

The security level functionality 16 is arranged to store the appropriate security level. This security level is adaptive and is controlled by the intrusion detection functionality 10 which is able to itself make an assessment as to the appropriate security level and/or receive an input from the security device which influences the security level.

The user equipment has a local event log repository 12 which has a full detail level logging functionality of events. The log repository 12 can be a ring file, that is a file in which the oldest entries present are overwritten with the new data when the maximum specified size of the file is reached. Alternatively, the repository can be a buffer or any other suitable memory device.

A reporter 14 is provided. This has an input from the security level functionality 16. The security level set influences the behavior of the reporter 14. The reporter 14 is arranged to select at least some of the data in the log repository 12 and forward it to the security device 6. The amount and type of log data selected by the reporter 14 is influenced by the security level. For example, if the security level is "normal" no log data or only some of the log data is sent to the security device. If, on the other hand, the security level is higher than normal, a greater amount or all of the data in the local repository is sent to the security device. In one security level which may be the highest or another security level, no data may be sent.

It should be appreciated that in one embodiment of the present invention there may be only two different security levels. Those security levels may be a normal and a higher security level. However, in alternative embodiments of the present invention there may be more than two different security levels.

The security level may influence the amount of data sent back to the security device and/or the frequency that reporter sent to the end of the device. Thus, the mobile device sends security log data of varying levels of detail to the security device 6. In one embodiment, if the security level is indicated to be normal, only short summary reports may be sent at relatively long intervals. At higher security levels, the amount of detail and reporting frequency are increased, up to a point at which all security log data is sent to the security device.

Examples of data which can be included in the security log data can include one or more of the following:—
Status indicators such as: Bluetooth BLUETOOTH™ state—is it connected or not; Battery bars—the number of "bars" indicating the amount of charge in the battery; Back Light state—is it on or off and so on . . .
Time series: Calls received (h (hour number), count (number of calls received)): ((0 0)(1 0)(2 0)(3 0)(4 0)(5 0)(6 0)(7 1)(8 4)(9 8)(10 3)(11 7)(12 2)(13 5) . . . (24 0), Calls made or the like
System Log events: 07:45:21 received call (length=3:14); 07:48:35 out of battery; 07:51:43 boot; or the like
Application log events: 07:52:06 GPS (global positioning system) module started (param1= . . . param2= . . . ).

In one embodiment of the present invention, local security alarms which are detected by the user equipment are sent to the security device. In embodiments of the present invention, the intrusion detection functionality may be the entity which detects potential security incidents and sends the alarms to the security device.

In one embodiment, additionally or alternatively, the security device may send a request for data to the user equipment. Those requests are typically received by the reporter 14 which formulates and sends a response to the request using data stored in the local event log repository. The security device will request security-related information.

In one embodiment, optionally the increase in logging level can include a backtracking property. That is when the security level is escalated to a higher level, the increased reporting is applied not only to data from the particular point of time at which the higher level is implemented, but can also include data preceding the point of the security level escalation. This data can be sent to the security device. Advantageously, this enables the security device to analyze events that were potentially the cause for the escalation of the security level.

Backtracking can also occur for a given security level. It is not necessary in some embodiments of the present invention for there to be a change in level in order for backtracking to occur.

Reference is now made to FIG. 3 which shows the elements of the security device schematically. The security device comprises a log data collector 30, a log data correlator 32, intrusion detection functionality 34 and log data storage 36. The security device is arranged to provide a network level view of the security of the mobile device pool as a whole. By mobile device pool it is meant the user equipment operating in a given network or part of a network.

The log data collector 30 is arranged to collect the log data received from a number of different user equipment. The data which is received from the user equipment is stored in the log data storage 36. The log data collector 30 is also arranged to log the data requests which are sent to the different user equipment.

The log data correlator 32 correlates security alarms and/or security log data sent by the various user equipment to identify common alarm patterns or root causes for alarms. The correlation results are used to filter out irrelevant alarms and/or are provided as an input to the intrusion detection functionality 34.

The intrusion detection functionality 34 monitors the traffic to and from the different user equipment, security alarms from the different user equipment, as well as the results of the correlation functionality. Thus, the intrusion detection functionality is arranged to receive security alarms from user equipment, as well as the correlation results from the log data correlator. Information about alarm indications are output by the intrusion detection functionality to the log data collector, which uses that information to formulate data requests to be sent to the user equipment. The intrusion detection functionality also receives sensor data/alarms from legacy intrusion detection systems and sensors, if present in the network. Finally, the intrusion detection functionality also receives traffic data from the network.

Thus, there may be a push mode of delivering security relevant data from the different user equipment to the security device. There may also be a pull type of information gathering that may be enabled in order to provide thorough security analysis. In the pull mode of operation, the security device is assumed to have an intrusion detection functionality which monitors the traffic to and from the mobile devices as well as the security reports and/or alarms received from the user equipment. Based on the monitored data the intrusion detection functionality can issue a security alarm if it determines suspicious activity in some of the user equipment or a set of user equipment. Based on these alarms, a security device can issue log data requests to user equipment potentially affected by the security alarm. As discussed earlier, the user equipment responds to the requests by providing the requested log data at a requested level of detail. Based on the more detailed data received from the user equipment, the security device can perform further analysis and raise a high level alarm or cancel the original alarms.

The alarm indications can be sent to the user equipment which uses the information to set the security level. Alternatively, the security device may be arranged to send information to the user equipment which defines the security level at which the user equipment is to operate.

Embodiments of the invention have the advantage that it is possible to reduce the amount of security related data that has to be transferred to the security device whilst still providing the possibility of providing full detail data analysis for security incidents. By performing full detail data transfer only for those ones of the user equipment that are regarded as having behaved strangely or considered to be at risk of or having been attacked, the analysis can be concentrated on those devices that are most likely to be involved in a security incident. There are also two levels of security monitoring—a localised security monitoring in the user equipment and a higher level security monitoring by the security device.

Thus, embodiments of the present invention concentrate the security data collection from the user equipment to the security device on pieces of data that are potentially particularly interesting.

In embodiments of the present invention, the functionality shown in FIGS. 2 and 3 can be achieved primarily by software, primarily by hardware or by a combination thereof. For example, in one embodiment of the present invention, the security level functionality 16, the intrusion detection functionality, the reporter 14 and part of the local event log repository are implemented by software in a microprocessor. As is known, the software may be stored in a memory, the memory being a computer readable medium having program code. The memory does not encompass a carrier wave. The local event log repository may also include a data storage portion of the type discussed previously.

The log data collector, the log data correlator and the intrusion detection functionality of FIG. 3 may also all be implemented in software with for example the log data storage being implemented by a suitable memory or the like.

Accordingly, embodiments of the present invention can be implemented by a computer program.

It should be appreciated that embodiments of the present invention can be implemented in a network in accordance with any suitable standard. For example, embodiments of the present invention can be used in the context of a mobile communications network operating in accordance with the GSM (global system for mobile communications), 3GPP (third generation partnership standard), CDMA2000 (code division multiple access) or in relation to any other standard. Embodiments of the invention can also be operated in the context of the WLAN standards such as the 802 standards or any other suitable standard.

Although described in the context of particular embodiments, it will be apparent to those skilled in the art that a number of modifications and various changes to those teachings may occur. Thus, whilst the invention has been particularly shown and described with respect to one or more preferred embodiments thereof, it will be understood by those skilled in the art that certain modifications or changes, in form and shape, may be made therein without departing from the scope and spirit of the invention.

The invention claimed is:

1. Apparatus comprising:
a processor configured to perform at least the following:
monitor said apparatus for security attacks and to store collected security related data comprising a full detail level logging functionality of events;
select and send at least some of the collected security related data from the full detail level logging functionality of events to a network security node, wherein the amount of the collected security related data selected and sent to said security node over the network is dependent on a security level of said apparatus, where said processor is operable in a pull mode of operation in response to a security alarm received from the network security node so as to send over the network, upon request of the network security node, the collected security related data at a requested level of detail, and where in response to a reception of a notification of an increase in security level from an initial security level at a certain point in time, said processor is further configured to operate in a backtracking mode so as to send over the network collected security related data at an increased level of detail both for times subsequent to the point in time and for times preceding the point in time, the increased level of detail relative to a level of detail for the initial security level.

2. Apparatus as claimed in claim 1, wherein said security level is dependent on information received from said security node.

3. Apparatus as claimed in claim 1, wherein said security level is dependent on an output of said monitor operation.

4. Apparatus as claimed in claim 1, wherein more data is sent to said network security node when there is a higher security level than when there is a lower security level.

5. Apparatus as claimed in claim 1, wherein all of the data is sent to the network security node for one security level.

6. Apparatus as claimed in claim 1, comprising a memory arranged to store security data.

7. Apparatus as claimed in claim 6, wherein said sent data comprises at least some of said security data.

8. Apparatus as claimed in claim 6, wherein said memory is configured such that oldest security data is overwritten by newest security data.

9. Apparatus as claimed in claim 1, wherein said processor is configured to detect a potential security attack and in response to said detection to cause a transmission of information to said security node.

10. Apparatus as claimed in claim 1, wherein said processor is configured to detect potential security attacks and in response to said detection, to cause a change of security level.

11. Apparatus as claimed in claim 1, wherein said apparatus is configured to have at least two security levels.

12. Apparatus as claimed in claim 1, wherein said processor is at least one of rule based or behavior profile-based.

13. Apparatus as claimed in claim 1, wherein said apparatus is a mobile device.

14. The apparatus as claimed in claim 1, wherein the level of detail comprises both amount of collected security related data and an interval between when a first set of collected security related data is sent and a second set of collected security related data is sent.

15. An apparatus comprising:
a processor configured to perform at least the following:
receive collected security related data from a plurality of devices, the amount of collected security related data received being dependent on a security level of each device and comprising a portion of a full detail level logging functionality of events stored by each of the plurality of devices;
correlate said received collected security related data to filter said received collected security related data; and
determine security attacks from said received collected security related data and to send information to configure the security level of the plurality of devices; where said processor is further configured to operate at least one of the plurality of devices in a pull mode of operation, in response to a security alarm sent to the at least one device, so as to receive over a network, upon request of the apparatus, the collected security related data at a requested level of detail, and where said processor is further configured, in response to a determined increase in security level from an initial security level at a certain point in time, to cause selected at least one of the plurality of devices to operate in a backtracking mode so as to cause the selected at least one device to send over the network and to the apparatus collected security related data at an increased level of detail both for times subsequent to the point in time and for times preceding the point in time, the increased level of detail relative to a level of detail for the initial security level.

16. An apparatus as claimed in claim 15, wherein said processor is configured to monitor at least one of traffic to or traffic from said devices.

17. An apparatus as claimed in claim 15, wherein said processor is configured to send information to at least one device, said information defining a security level for said device.

18. The apparatus as claimed in claim 15, wherein the level of detail comprises both amount of collected security related data and an interval between when a first set of collected security related data is sent by said selected at least one device and a second set of collected security related data is sent by said selected at least one device.

19. A method comprising:
collecting with a processor security related data comprising a full detail level logging functionality of events;
storing the collected security related data;
selecting at least some of the collected security related data from the full detail level logging functionality of events; and
sending at least some of said collected security related data to a security node in a network, the amount of the collected security related data selected and sent over the network being dependent on a security level, where in a pull mode of operation initiated in response to a security alarm received from the security node, sending the at least some of said collected security related data is performed upon request of the security node, and where in response to a reception of a notification of an increase in security level from an initial security level at a certain point in time, said processor is further configured to operate in a backtracking mode so as to send over the network collected security related data at an increased level of detail both for times subsequent to the point in time and for times preceding the point in time, the increased level of detail relative to a level of detail for the initial security level.

20. The method as claimed in claim 19, wherein the level of detail comprises both amount of collected security related data and an interval between when a first set of collected security related data is sent and a second set of collected security related data is sent.

21. A method comprising:
receiving collected security related data from a plurality of devices, the amount of collected security related data received being dependent on a security level of each device and comprising a portion of a full detail level logging functionality of events stored by each of the plurality of devices;
correlating said received collected security related data to filter said received collected data;
determining security attacks from said received collected security related data;
sending information to set the security level of the plurality of devices, where in a pull mode of operation the receiving of the collected security related data from at least one of the plurality of devices is in response to sending a security alarm to the at least one device, and in response to a request that is sent to the at least one device to send the collected security related information; and
in response to a determined increase in security level from an initial security level at a certain point in time, causing selected at least one of the plurality of devices to operate in a backtracking mode so as to cause the selected at least one device to send over the network collected security related data at an increased level of detail both for times subsequent to the point in time and for times preceding the point in time, the increased level of detail relative to a level of detail for the initial security level; and
receiving said collected security related data at said increased level of detail.

22. The method as claimed in claim 21, wherein the level of detail comprises both amount of collected security related data and an interval between when a first set of collected security related data is sent by said selected at least one device and a second set of collected security related data is sent by said selected at least one device.

23. A computer program, embodied on a non-transitory computer readable medium, the computer program configured to control a processor to perform a method comprising:
collecting security related data comprising a full detail level logging functionality of events;
storing the collected security related data,
selecting at least some of the collected security related data;
sending at least some of said collected security related data from the full detail level logging functionality of events to a network security node, the amount of the collected security related data selected and sent over the network being dependent on a security level, where in a pull mode of operation initiated in response to a security alarm received from the security node, sending the at least some of said collected security related data is performed upon request of the security node; and
where in response to a reception of a notification from the security node of an increase in security level from an initial security level at a certain point in time, operating in a backtracking mode so as to send over the network collected security related data at an increased level of detail both for times subsequent to the point in time and for times preceding the point in time, the increased level of detail relative to a level of detail for the initial security level.

24. The computer program of claim 23, wherein the level of detail comprises both amount of collected security related data and an interval between when a first set of collected security related data is sent and a second set of collected security related data is sent.

25. A computer program embodied on a non-transitory computer readable medium, the computer program configured to control a processor to perform a method comprising:
receiving collected security related data from a plurality of devices, the amount of collected security related data received being dependent on a security level of each device and comprising a portion of a full detail level logging functionality of events stored by each of the plurality of devices;
correlating said received collected security related data to filter said received collected security related data; and
determining security attacks from said received collected security related data; and
sending information to set the security level of the plurality of devices, where in a pull mode of operation the receiving of the collected security related data from at least one of the plurality of devices is in response to sending a security alarm to the at least one device, and in response to a request that is sent to the at least one device to send the collected security related information;
in response to a determined increase in security level from an initial security level at a certain point in time, causing selected at least one of the plurality of devices to operate in a backtracking mode so as to cause the selected at least one device to send over the network collected security related data at an increased level of detail both for times subsequent to the point in time and for times preceding the point in time, the increased level of detail relative to a level of detail for the initial security level; and receiving said collected security related data at said increased level of detail.

26. The computer program of claim 25, wherein the level of detail comprises both amount of collected security related data and an interval between when a first set of collected security related data is sent by said selected at least one device and a second set of collected security related data is sent by said selected at least one device.

* * * * *